US012644475B2

(12) United States Patent
Desseux

(10) Patent No.: US 12,644,475 B2
(45) Date of Patent: Jun. 2, 2026

(54) AERIAL WORK PLATFORM, AND METHOD FOR CONTROLLING AN AERIAL WORK PLATFORM

(71) Applicant: HAULOTTE GROUP, Lorette (FR)

(72) Inventor: Didier Desseux, Solaize (FR)

(73) Assignee: HAULOTTE GROUP, Lorette (FR)

( * ) Notice: Subject to any disclaimer, the term of this patent is extended or adjusted under 35 U.S.C. 154(b) by 440 days.

(21) Appl. No.: 18/553,939

(22) PCT Filed: Apr. 8, 2022

(86) PCT No.: PCT/EP2022/059376
§ 371 (c)(1),
(2) Date: Oct. 4, 2023

(87) PCT Pub. No.: WO2022/214638
PCT Pub. Date: Oct. 13, 2022

(65) Prior Publication Data
US 2024/0200579 A1 Jun. 20, 2024

(30) Foreign Application Priority Data
Apr. 9, 2021 (FR) ....................................... 2103671

(51) Int. Cl.
*F15B 11/16* (2006.01)
*B66F 11/04* (2006.01)
*F04B 17/03* (2006.01)

(52) U.S. Cl.
CPC ............ *F15B 11/16* (2013.01); *B66F 11/044* (2013.01); *F04B 17/03* (2013.01); *F15B 2211/20515* (2013.01); *F15B 2211/6654* (2013.01)

(58) Field of Classification Search
CPC .... F15B 2211/20515; F15B 2211/6654; F15B 11/16; B66F 11/044; F04B 17/03
See application file for complete search history.

(56) References Cited

U.S. PATENT DOCUMENTS 5,159,989 A * 11/1992 Claxton ................ B66F 11/044 180/41
5,944,204 A * 8/1999 Vollmer ................ B66F 11/044 182/2.9

(Continued)

FOREIGN PATENT DOCUMENTS

JP 2000310205 A 11/2000
JP 2002326799 A 11/2002

(Continued)

OTHER PUBLICATIONS

International Search Report for PCT/EP2022/059376 mailed Jul. 18, 2022, 4 pages.

(Continued)

*Primary Examiner* — Daniel J Troy
(74) *Attorney, Agent, or Firm* — NIXON & VANDERHYE

(57) ABSTRACT

The aerial work platform includes a chassis, a basket, a hydraulic lifting structure and a hydraulic system. A control unit includes a circulation circuit, an electric motor pump and a flow regulator. To simultaneous displace two different parts of the lifting structure, the actuators are divided between first and second groups and the control unit determines first and second target flow rates, while controlling the motor pump with a delivery flow rate greater than or equal to the sum of the target flow rates. The control unit controls the flow rate controller to send toward the groups a regulated proportion of the fluid from the motor pump, presenting a flow rate equal to the sum of the target flow rates, and then to divide this regulated proportion into two adjusted parts, respectively presenting the first and second target flow rates and respectively sent to the first and second groups.

12 Claims, 2 Drawing Sheets

(56) References Cited

U.S. PATENT DOCUMENTS

| | | | | |
|---|---|---|---|---|
| 6,810,993 | B2 * | 11/2004 | Promersberger | B66F 11/044 182/63.1 |
| 6,848,693 | B2 * | 2/2005 | Schneider | B60S 9/12 280/6.155 |
| 11,987,958 | B2 * | 5/2024 | Kondo | E02F 9/2278 |
| 12,434,760 | B2 * | 10/2025 | Billich | B60T 13/686 |
| 2010/0242464 | A1 * | 9/2010 | Vigholm | E02F 9/2296 60/327 |
| 2024/0328440 | A1 * | 10/2024 | Zimmerman | E02F 9/2246 |

FOREIGN PATENT DOCUMENTS

| | | | |
|---|---|---|---|
| JP | 2004142899 | A | 5/2004 |
| JP | 2006052762 | A | 2/2006 |

OTHER PUBLICATIONS

Written Opinion of the ISA for PCT/EP2022/059376 mailed Jul. 18, 2022, 9 pages.
Search Report for FR2103671 dated Dec. 23, 2021, 2 pages.

* cited by examiner

AERIAL WORK PLATFORM, AND METHOD FOR CONTROLLING AN AERIAL WORK PLATFORM

CROSS-REFERENCE TO RELATED APPLICATIONS

This application is the US national stage of PCT/EP2022/059376, filed Apr. 8, 2022 and designating the United States, which claims the priority of FR2103671, filed Apr. 9, 2021. The entire contents of each foregoing application are incorporated herein by reference.

BACKGROUND OF THE INVENTION

Field of the Invention

The present invention concerns an aerial work platform, as well as a method for controlling such a platform.

More specifically, the invention concerns aerial work platforms of which the components of the lifting structure are moved by hydraulic actuators that the user operates by means of a fluid, typically oil, which circulates in a hydraulic circuit under the effect of an electrically driven pump. This type of aerial work platform, the ground movement of which is also generally operated by an electric motor, thus comprises an electric motor pump, which draws fluid from a reservoir in the hydraulic system and pumps the fluid back into the hydraulic circuit to circulate it to the hydraulic actuators.

Description of the Related Art

When the user commands the activation of one of the hydraulic actuators, all or part of the fluid delivered by the motor pump is sent to the relevant actuator to activate it. The speed at which the actuator is activated, and therefore the speed of displacement of the corresponding part of the lifting structure of the aerial work platform, is directly linked to the flow rate of the fluid supplying the actuator, so that when the user commands the hydraulic actuator to operate at high speed, the motor pump can, if required, be controlled to increase its delivery flow rate. In addition, each hydraulic actuator on the aerial work platform can be associated with a proportional electrovalve that takes a flow of fluid from the fluid flow delivered by the motor pump and sends it to the actuator, being adjusted if necessary to the operating requirements of the actuator. In all cases, the fraction of the delivered flow not used by the hydraulic actuator is returned directly to the reservoir. It is understood that, thanks to the various proportional electrovalves, the user can simultaneously operate two actuators and thus perform two parallel displacements of respective different parts of the lifting structure, provided that the discharge flow is sufficient to cover the respective needs of the two operations. This being said, the presence of these various proportional electrovalves makes the hydraulic circuit complex and costly, which is not always desirable for certain types of aerial work platform, particularly those of limited size.

In the absence of such proportional electrovalves, it may be possible to allow the user to operate two hydraulic actuators simultaneously, but the fluid may then risk flowing predominantly toward the actuator offering the least resistance. This leads to displacements of the lifting structure that are dangerous, as they are not very precise and are difficult to control, since these displacements depend, among other things, on the configuration of the lifting structure and the load on the platform.

JP 2002 326799 discloses a vehicle with a lifting platform. This vehicle includes a lifting structure operated by hydraulic actuators which are respectively associated with control levers. The hydraulic actuators are supplied with fluid by a pump driven by an electric motor which is controlled by an electronic circuit belonging to a controller. The electronic circuit is designed to calculate the fluid flows respectively required by the hydraulic actuators as a function of their operation by the control levers. In particular, when several of the control levers are activated simultaneously, the circuit adds up the flow rates respectively required to activate the respective corresponding hydraulic actuators. On the basis of the total flow rates required, the electronic circuit drives the electric motor so that the pump delivers the fluid at a rate covering at least the needs of the actuators actually activated. In order to distribute the fluid delivered by the pump between the various hydraulic actuators, the hydraulic system of the vehicle includes an electromagnetic proportional opening control assembly, which is controlled by a dedicated circuit connected to the aforementioned control levers.

SUMMARY OF THE INVENTION

The aim of the present invention is to propose an improved aerial work platform which, while having a simple and inexpensive hydraulic system, allows the simultaneous displacement of two different parts of its lifting structure to be operated in a controlled manner.

To this end, the invention has as its object an aerial work platform including:

- a chassis which is provided with ground translation members,
- a basket which is adapted for an operator to stand on,
- a lifting structure, which supports the basket and is arranged on the chassis so as to more or less lift the basket relative to the chassis,
- hydraulic actuators which act on respective parts of the lifting structure so as to displace said respective parts relative to the rest of the lifting structure or relative to the chassis,
- a hydraulic system comprising:
  - a circulation circuit through which fluid flows between a reservoir and the hydraulic actuators,
  - a motor pump which is electric and draws fluid from the reservoir and delivers to the circulation circuit for circulation, and
  - a flow regulation sub-system for regulating fluid flow in the circulation circuit between the reservoir and the hydraulic actuators, and
- a control unit allowing to control the hydraulic system,
- wherein the hydraulic actuators are divided between a first group of one or more of the hydraulic actuators and a second group of one or more of the hydraulic actuators, the hydraulic actuator or actuators of the first group being distinct from the hydraulic actuator or actuators of the second group,
- wherein the control unit is able to:
- determine both a first target flow rate as a function of by-operator activation of the hydraulic actuator(s) of the first group and a second target flow rate as a function of by-operator activation of the hydraulic actuator(s) of the second group, and control the motor pump so that the motor pump delivers the fluid at a delivery flow rate which is greater than or equal to the sum of the first and second target flow rates, wherein the flow regulation sub-system is able, by being controlled by the control unit, to:

send jointly toward the first and second groups a regulated proportion of fluid delivered by the motor pump, this regulated proportion presenting a controlled flow rate which is equal to the sum of the first and second target flow rates, then dividing said regulated proportion into two adjusted portions, which respectively present the first and second target flow rates and which are respectively sent to the first group and to the second group, wherein the flow regulation sub-system comprises a flow distribution device which:

is provided with three ports, namely an inlet port, which is supplied with said regulated proportion of the fluid delivered by the motor pump, a first outlet port, which supplies fluid to the first group, and a second outlet port, which supplies fluid to the second group, and is able to distribute all fluid in the inlet port between the first and second outlet ports, the flow distribution device being controlled by the control unit so that the first outlet port receives the adjusted portion presenting the first target flow rate and the second outlet port receives the adjusted portion presenting the second target flow rate, and wherein the flow regulation sub-system further comprises a flow regulating device, which:

is provided with three ports, namely an intake port, which receives all fluid delivered by the motor pump, a main outlet port, which sends fluid to the inlet port of the flow distribution device, and a secondary outlet port, which sends fluid directly to the reservoir, and is able to regulate a flow of fluid from the intake port toward the main and secondary outlet ports, the flow regulating device being controlled by the control unit so that the main outlet port receives said regulated proportion of fluid delivered by the motor pump while a surplus of fluid delivered by the motor pump, which has a flow rate equal to the difference between the delivered flow rate and the controlled flow rate, is evacuated through the secondary outlet port.

The invention also has as its object a method for controlling an aerial work platform, the aerial work platform comprising:

a chassis provided with ground translation members, a basket suitable for an operator to stand on, a lifting structure, which supports the basket and is arranged on the chassis so as to more or less lift the basket relative to the chassis, hydraulic actuators, which act on respective parts of the lifting structure so as to move said respective parts relative to the rest of the lifting structure or relative to the chassis, and which are divided between a first group of one or more of the hydraulic actuators and a second group of one or more of the hydraulic actuators, the hydraulic actuator or actuators of the first group being distinct from the hydraulic actuator or actuators of the second group, and a hydraulic system comprising:

a circulation circuit through which fluid flows between a reservoir and the hydraulic actuators, a motor pump which is electric and draws fluid from the reservoir and delivers to the circulation circuit for circulation, and a flow regulation sub-system for regulating fluid flow in the circulation circuit between the reservoir and the hydraulic actuators, wherein a first target flow rate is determined as a function of activation of one or more hydraulic actuators of the first group by an operator using the aerial work platform, wherein a second target flow rate is determined as a function of activation of one or more hydraulic actuators of the second group by the operator, wherein the motor pump is controlled so that fluid delivered by the motor pump presents a delivery flow rate which is greater than or equal to the sum of the first and second target flow rates, wherein the flow regulation sub-system is controlled to:

jointly send toward the first and second groups a regulated proportion of fluid delivered by the motor pump, the regulated proportion presenting a controlled flow rate which is equal to the sum of the first and second target flow rates, then divide said regulated proportion into two adjusted portions, which respectively present the first and second target flow rates and which are respectively sent to the first group and to the second group, wherein the flow regulation sub-system comprises:

a flow distribution device which is provided with three ports, namely an inlet port, which is supplied with said regulated proportion of fluid delivered by the motor pump, a first outlet port, which sends fluid to the first group, and a second outlet port, which sends fluid to the second group, and a flow regulating device which is provided with three ports, namely an intake port, which receives all fluid delivered by the motor pump, a main outlet port, which sends fluid to the inlet port of the distribution device, and a secondary outlet port, which sends fluid directly to the reservoir, wherein the flow distribution device is controlled to distribute all fluid in the inlet port between the first and second outlet ports, so that the first outlet port receives the adjusted portion presenting the first target flow rate and the second outlet port receives the adjusted portion presenting the second target flow rate, and wherein the flow regulating device is controlled to regulate the flow of fluid from the intake port to the main and secondary outlet ports, so that the main outlet port receives said regulated proportion of fluid delivered by the motor pump while an excess of fluid delivered by the motor pump, which has a flow rate equal to the difference between the delivered flow rate and the controlled flow rate, is evacuated through the secondary outlet port.

One of the ideas behind the invention is, from the fluid flow discharged by the electric motor pump, to be able to circulate the fluid to the hydraulic actuators with a precise flow rate, which is adjusted to the requirements of the activation of one or two hydraulic actuators, and which is distributed in a regulated manner with respect to this or these two actuators. For this purpose, the hydraulic actuators of the aerial work platform in accordance with the invention are divided into two groups of one or more actuators. In addition, when the operator commands the activation of the or one of the actuator(s) of the first group and/or the activation of the or one of the actuator(s) of the second group, a first target flow rate for the activation requirements of the first group and a second target flow rate for the activation requirements of the second group are determined, it being understood that the second target flow rate is zero in the case where the operator commands the activation of the actuator(s) of the first group only, and it being understood that the first target flow rate is zero in the case where the operator controls the activation of the or one of the actuator(s) of the second group only. In all cases, the motor pump is controlled so that its delivery flow rate, in other words, the flow rate of the fluid leaving the motor pump under the effect of the discharge generated by the latter, is equal to or greater than the sum of the first and second target flow rates. The invention then provides for a regulated proportion of the fluid delivered by the motor pump to be sent jointly to the first and second groups, this regulated proportion presenting a controlled flow rate which is equal to the sum of the first and second target flow rates. The invention then provides for this regulated proportion to be distributed into two adjusted portions, which present the first and second target flow rates respectively, and which are sent to the first and second groups respectively to activate the two hydraulic actuators concerned, precisely and in accordance with the command of the operator. In practice, the corresponding flow regulation and distribution operations are carried out respectively by a flow regulation device and, downstream of the latter, a flow distribution device, which belong to an ad hoc flow regulation sub-system, controlled by an appropriate control unit, typically a computer integrated into the aerial work platform, this control unit also ensuring determining the first and second target flows, as well as controlling the motor pump. As will be explained later, the above-mentioned flow regulation sub-system can present a particularly simple and inexpensive embodiment. In any case, the invention allows to simultaneously displace two different parts of the lifting structure of the aerial work platform, thereby increasing the productivity of the aerial work platform, while precisely controlling the reliability of the two corresponding movements so that they respond to the control instructions given by the user of the platform. The invention does not require numerous and/or complex, and therefore costly, hydraulic devices. In particular, each hydraulic actuator does not have to be associated with a proportional electrovalve to control its operation. Similarly, the motor pump of the platform in accordance with the invention can be of simple, low-cost technology, having in particular a fixed displacement pump, this motor pump having for example a gear pump. The invention thus finds a preferential, but non-limiting, application to aerial work platforms, which are self-propelled and which have an exclusively electric primary energy source, having in particular a power of between 2 and 15 KW, and/or to aerial work platforms of which a basket height is moderate, in particular less than 16 m.

According to advantageous optional features of the aerial work platform in accordance with the invention:

- the motor pump includes a fixed-displacement pump and an electric motor which drives the fixed-displacement pump, the delivery flow rate being proportional to the speed at which the electric motor drives the fixed-displacement pump, the fixed-displacement pump is designed to be driven by the electric motor at a predetermined minimum speed which is associated with a minimum value for the delivery flow rate, the fixed-displacement pump being in particular a gear pump, and the control unit is unable to control driving of the fixed-displacement pump below the predetermined minimum speed, irrespective of the values of the first and second target flow rates;
- the flow distribution device includes:
  - a first proportional electrovalve, which is able to control flow of fluid from the inlet port to the first outlet port so as to interrupt or adjust by a controlled passage section flow of fluid from the inlet port to the first outlet port, as a function of a control signal which the control unit emits, from the respective values of the first and second target flow rates, and
  - a first pressure compensator), which is able to connect upstream of the first proportional electrovalve to the second outlet port and to connect downstream of the first proportional electrovalve to the first outlet port according to inverse respective connection proportions which are a function of the pressure differential between upstream and downstream of the first proportional electrovalve;
- the flow regulating device includes:
  - a second proportional electrovalve, which is able to control flow of fluid from the intake port to the main outlet port so as to interrupt or adjust by a controlled passage section flow of fluid from the intake port to the main outlet port, as a function of a control signal which the control unit emits, from the sum of the first and second target flow rates, and
  - a second pressure compensator, which is able to connect upstream of the second proportional electrovalve to the secondary outlet port according to a connection proportion which is a function of the pressure differential between upstream and downstream of the second proportional electrovalve;
- the flow regulating device also includes an on-off electrovalve, which is able to control communication between a spring loaded chamber of the second pressure compensator and the reservoir so as to interrupt or allow communication between the spring loaded chamber of the second pressure compensator, as a function of a control signal which the control unit emits;
- the chassis is equipped with a hydraulic steering device, which acts on at least some of the ground translation members so as to adjust orientation of the at least some of the ground translation members relative to the chassis in order to direct the aerial work platform on the ground, and wherein the flow regulating device further includes an on-off distributor which is controlled by the control unit and able to send fluid from downstream of the second proportional electrovalve toward the hydraulic steering device;
- the flow regulating device is integrated into the chassis;
- several hydraulic actuators are provided in the first group and/or in the second group and are each associated with an on-off distributor of the flow regulation sub-system, which is controlled by the control unit and is able to send fluid to the corresponding hydraulic actuator from the rest of the flow regulation sub-system;
- the lifting structure comprises a turret, which rests on the chassis and is rotatable relative to the chassis about an rotation axis extending perpendicularly to the ground, and an arm, which connects the turret to the basket and is deployable to move the basket more or less away from the turret, and wherein the hydraulic actuators act both on the turret to rotate the turret about the rotation axis relative to the chassis and on the arm to deploy the arm relative to the turret;
- the lifting structure is designed to lift the basket to a height of less than 16 meters;

the chassis incorporates the motor pump and an electric motor which drives the ground translation members, the chassis having a total electric power of between 2 and 15 kW.

BRIEF DESCRIPTION OF THE DRAWINGS

The invention will be better understood on reading the following description, given solely by way of example and made with reference to the drawings in which.

DETAILED DESCRIPTION

Figure 1:
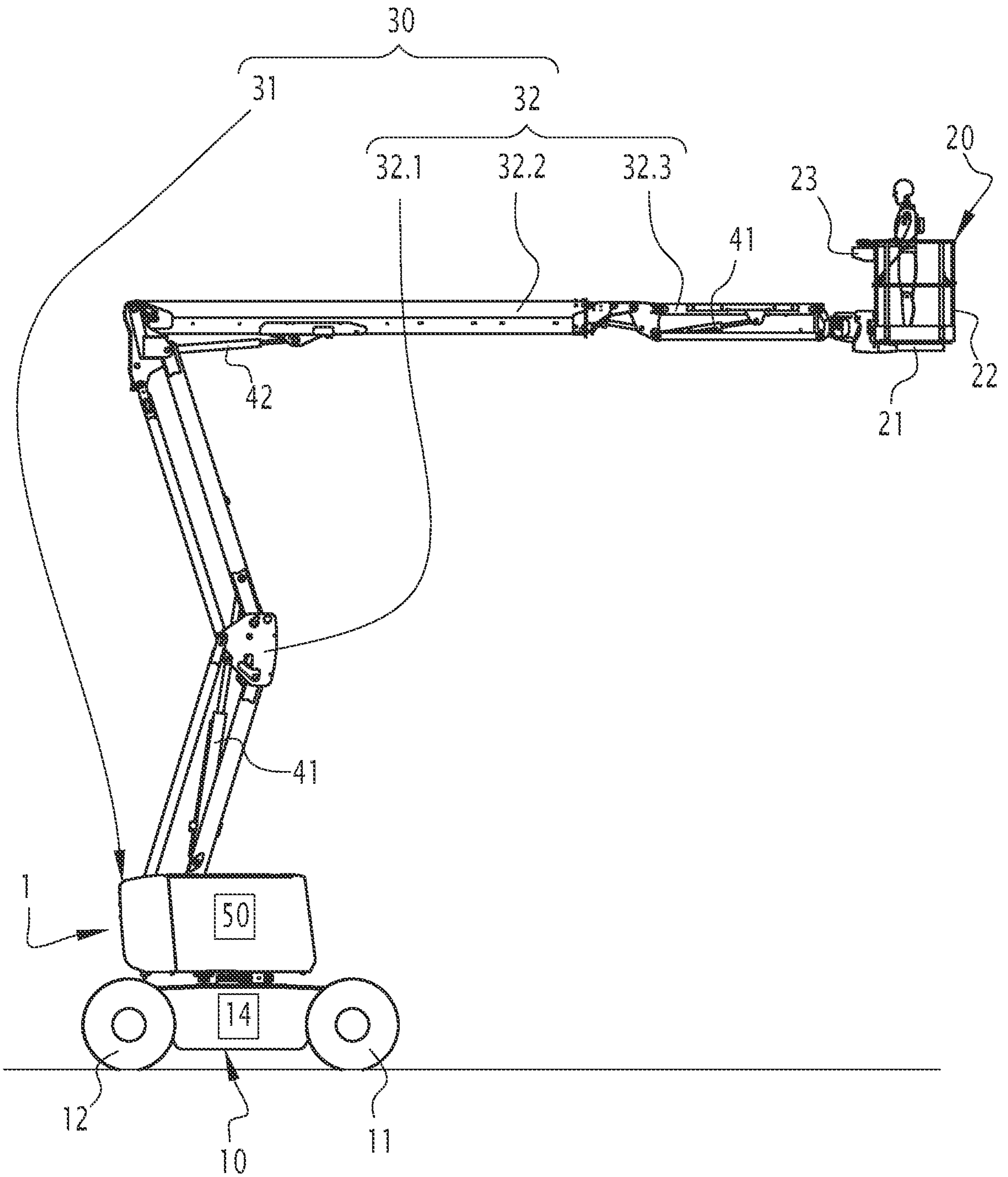
FIG. 1 is an elevation view of an aerial work platform in accordance with the invention.
Figure 2:
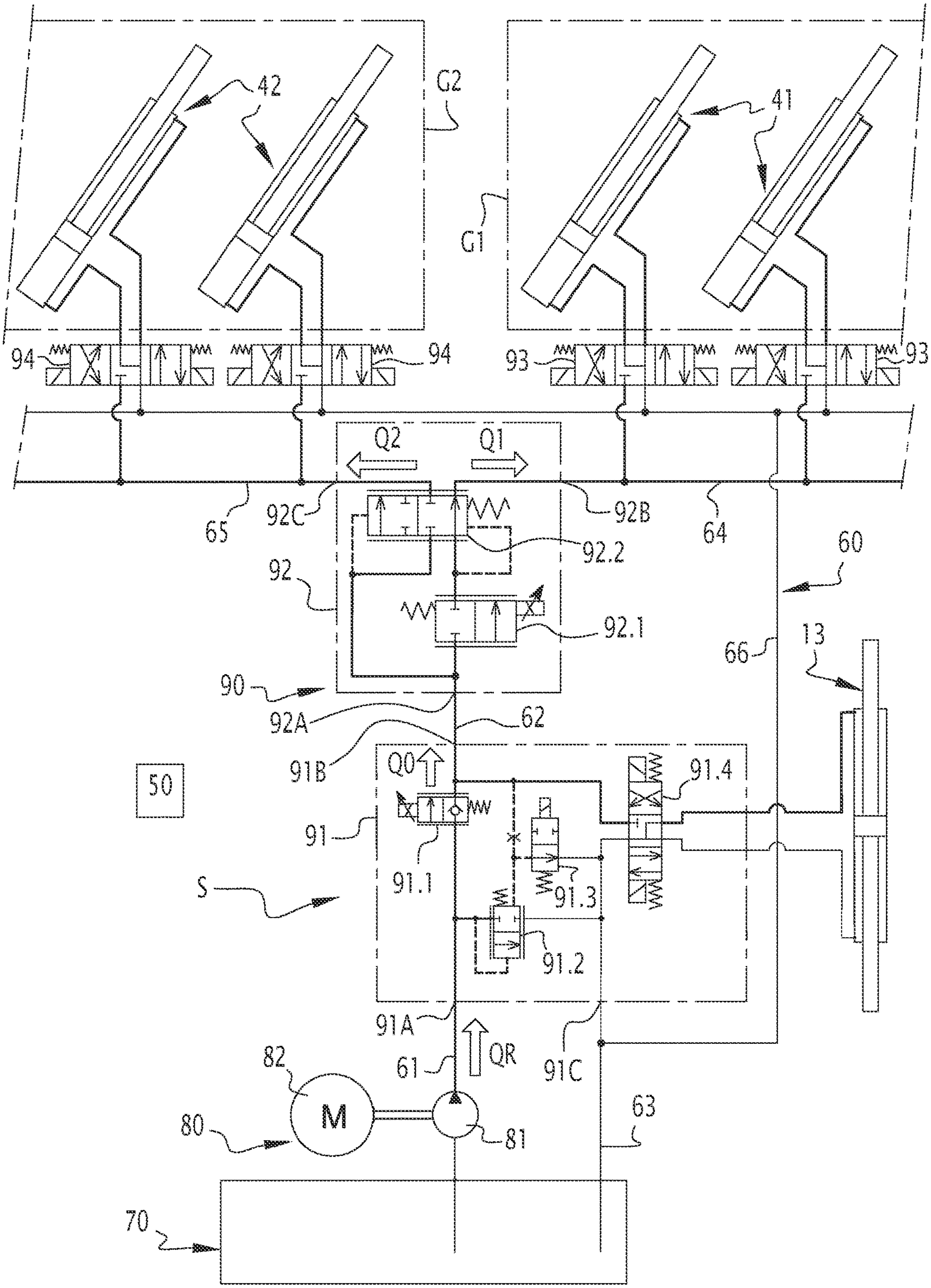
FIG. 2 is a schematic diagram of certain components of the platform in FIG. 1, in particular a hydraulic system of this latter.

FIGS. 1 and 2 show an aerial work platform 1 allowing an operator to reach a high area in order to perform work.

As shown in FIG. 1, the aerial work platform 1 comprises a chassis 10 resting on the ground. The chassis 10 is equipped with wheels for ground travel. In the example of the embodiment considered in the figures, these wheels are distributed as a pair of rear wheels 11 and a pair of front wheels 12.

The wheels of at least one of the two pairs of wheels 11 and 12 are steerable, being able to be turned to the left and to the right relative to an antero-posterior geometric axis of the chassis 10, extending parallel to the ground. This turning of the steerable wheels 11 and/or 12 allows the chassis 10 to rotate correspondingly relative to the ground. The steerable wheels 11 and/or 12 can thus be adjustably oriented relative to the chassis 10 in order to steer the aerial work platform 1 over the ground along a trajectory controlled by the operator using the aerial work platform 1. To this end, in the example of the embodiment considered in the figures and as schematically indicated in FIG. 2, the chassis 10 includes a hydraulic steering device 13 which acts on the steerable wheels 11 and/or 12 to adjust their orientation relative to the chassis 10. The hydraulic steering device 13 is, as such, known in the art, in particular in the field of aerial work platforms, so that the embodiment of this device is not limiting.

As an alternative, not shown here, some or all of the rear wheels 11 and front wheels 12 can be replaced by caterpillar tracks to move the chassis 10 over the ground. More generally, the rear wheels 11 and front wheels 12 are only examples of the ground translation members fitted to the chassis 10.

Whatever the specific features of the ground translation members, such as the rear wheels 11 and front wheels 12, the chassis 10 is advantageously provided to be self-propelled, so that it can move along the ground on its own. To this end, the chassis 11 incorporates translation members, which drive at least some of the above-mentioned ground translation members, such as the rear wheels 11 and/or the front wheels 12. These translation members, which are not shown in the figures, are known in the field of self-propelled platforms, being for example of a mechanical and/or hydraulic and/or electrical nature. In all cases, these translation members are themselves driven by a motor 14, which is advantageously integrated into the chassis 10, as shown schematically in FIG. 1. In a preferred embodiment, the motor 14 is electric.

The aerial work platform 1 also comprises a basket 20, designed so that the operator using the aerial work platform can stand on it. The basket 20 is thus provided to accommodate this operator aboard as well as, if necessary, one or more other persons and/or equipment, in order to carry out work at height. To this end, the basket 20 comprises a floor 21, on which the operator stands, and a guardrail 22 that rises from the floor 21 and surrounds the basket 20. In addition, the basket 20 is equipped with a control panel 23, allowing the operator on board the basket to control the displacement of the chassis 10 on the ground and to operate a lifting structure 30 of the aerial work platform 1, supporting the basket 20.

The lifting structure 30 is arranged on the chassis 10 so as to more or less lift the basket 20 relative to the chassis 10. To this end, the lifting structure 30 comprises a turret 31, which rests on the chassis 10 and is rotatable relative to the latter about an axis of rotation extending perpendicular to the ground, and an arm 32, which connects the turret 31 to the basket 20 and is deployable so as to move the basket 20 more or less away from the turret 31.

The embodiment of the turret 31 is not limiting. Likewise, the embodiment of the arm 32 is not limiting: moreover, the term "arm" used here is understood in a broad sense and thus corresponds to an elongated mechanical structure, including several arm elements moveable relative to one another for the purposes of deploying this mechanical structure. In the example of the embodiment shown in the figures, the arm 32 is an articulated arm which, as can be seen in FIG. 1, includes a lower arm element 32.1, forming a pantograph the lower end of which is articulated on the turret 31, an intermediate arm element 32.2, forming a jib which is articulated on the upper end of the pantograph, and an upper arm element 32.3, forming a boom, one end of which is articulated to the jib while the opposite end supports the basket 20. The relative movements permitted by the arm elements 32.1, 32.2 and 32.3 are known per se and will not be described further, the reader being referred, for example, to FR 3 067 341. In an alternative, not shown, the arm 32 is at least partially telescopic, including arm elements that fit into one another.

More generally, the design of the lifting structure 30 is not limiting of the invention as long as, by displacing parts of this lifting structure relative to each other and/or relative to the chassis 10, the position of the basket 20 relative to the chassis 10 is modified in a corresponding manner, the basket 20 thus being controlled in displacement, by means of the lifting structure 30, by the operator using the aerial work platform 1.

Whatever the design of the lifting structure 30, the moving parts of the latter are driven in displacement relative to each other and/or relative to the chassis 10 by the hydraulic actuators which are integrated into the lifting platform 1. Thus, in the embodiment considered here, these hydraulic actuators act on the turret 31 to implement a rotation about the aforementioned axis of rotation relative to the chassis 10, as well as on the arm 32 for its deployment relative to the turret, in particular on the arm elements of the arm 32 for their displacement relative to one another. Such hydraulic actuators are known per se in the field of aerial work platforms, and the embodiment of each of them is not limiting of the invention. Thus, each of the aforementioned hydraulic actuators can, for example, be a single-acting cylinder, a double-acting cylinder, a rotary actuator, etc. Whatever their embodiment, the aforementioned hydraulic actuators are, as shown schematically in FIG. 2, divided into two groups, namely a group G1 constituted of one or more of these hydraulic actuators, the actuator(s) of group G1 being referenced 41, and a group G2 constituted of the remainder of the aforementioned hydraulic actuators, the actuator(s) of group G2 being referenced 42. In the example of the embodiment considered in the figures, group G1 includes a number of actuators 41 and group G2 also includes a number of actuators 42, as shown schematically in FIG. 2.

The fact of distributing the hydraulic actuators of the aerial work platform 1, which act on respective parts of the lifting structure 30 for the purpose of displacing the latter, presents an advantage which will appear in more detail later and which is linked to the possibility for the operator using the aerial work platform 1 to activate in a controlled manner simultaneously one of the actuators 41 of group G1 and one of the actuators 42 of group G2 and thus, thereby drive the lifting structure 30 simultaneously according to two movements, by displacing the two parts of this lifting structure on which the activated actuator 41 and the activated actuator 42 act respectively. In practice, the way in which the hydraulic actuators of the lifting platform 1, which act on the lifting structure 30, are divided between the groups G1 and G2 is not limiting of the invention and can be the subject of multiple alternatives, according to the specific features and operating choices of the lifting structure 30. By way of a non-limiting example, in the embodiment considered in the figures, the lower arm element 32.1 and the upper arm element 32.3 can be activated by two of the actuators 41 of group G1, while the intermediate arm element 32.2 is activated by one of the actuators 42 of group G2, as shown in FIG. 1.

In order to activate the actuators 41 and 42, the aerial work platform 1 includes a hydraulic system S, which is shown in FIG. 2 and will be detailed below, as well as a control unit 50 allowing the hydraulic system S to be controlled. In practice, the control unit 50 includes a computer or similar electronic components and is connected and slaved to the control console 23 of the basket 20 by means of the arrangements on the aerial work platform 1, which are known per se and will not be detailed here further.

The control unit 50 is able to determine both a first target flow rate Q1 as a function of a command issued by the operator using the aerial work platform 1 and destined for one of the actuators 41 of group G1, and a second target flow rate Q2 as a function of a command issued by this operator and destined for one of the actuators 42 of group G2. Thus, when the operator instructs one of the actuators 41 to move, by acting on an ad hoc control element of the control panel 23, the control unit 50 calculates the first target flow rate Q1 as being the fluid flow rate necessary to be sent to the actuator 41 concerned to displace the corresponding part of the lifting structure 30 according to the command applied by the operator. This fluid flow rate depends, among other things, on the speed of the displacement of the lifting structure 30, which is commanded by the operator: the greater the speed of this displacement commanded by the operator, the greater the fluid flow rate to be sent to the actuator 41 concerned. Similarly, when the operator commands one of the actuators 42 to activate, by acting on another ad hoc control element of the control panel 23, the control unit 50 calculates the second target flow rate Q2 as being the fluid flow rate necessary to be sent to the actuator 42 concerned to displace the corresponding part of the lifting structure 30 according to the command applied by the operator. Of course, when the user commands the activation of one of the actuators 41 without activating the actuators 42, the second target flow Q2 is zero. Similarly, when the operator commands the activation of one of the actuators 42 without activating the actuators 41, the first target flow Q1 is zero. When the operator simultaneously commands the activation of one of the actuators 41 and the activation of one of the actuators 42, the target flows Q1 and Q2 are both non-zero.

The hydraulic system S comprises a circulation circuit 60 through which a fluid, typically oil, circulates between a reservoir 70 of the hydraulic system S and the actuators 41 and 42. This circulation circuit 60 comprises, among other things, fluid flow lines, connecting the various components of the hydraulic system to each other and/or to the actuators 41 and 42, as shown in FIG. 2. In practice, these circulation circuit lines 60 are realized by pipes, possibly flexible, integrated into the aerial work platform 1. The reservoir 70 is preferably integrated into the chassis 10, the design of this reservoir 70 being non-limiting.

The hydraulic system S also includes a motor pump 80 that, as shown in FIG. 2, draws fluid from the reservoir 70 and delivers it into the circulation circuit 60 to circulate the fluid. The motor pump 80 is electric and thus includes a pump 81 and an electric motor 82 that drives the pump 81. The motor pump 80 is provided to be controlled by the control unit 50 so that, in service, the motor pump 80 delivers the fluid into the circulation circuit 60 at a delivery flow rate QR which is greater than or equal to the sum of the first target flow rate Q1 and the second target flow rate Q2. The control unit 50 is thus able to control the electric motor 82, in particular to control the speed at which this electric motor 82 drives the pump 81 so that the latter delivers the fluid into the circulation circuit 60 at the delivery flow rate QR.

In a practical and economical embodiment, the pump 81 is a fixed displacement pump, i.e. has a fixed displacement cylinder. As a result, the delivery rate QR is proportional to the speed at which the electric motor 82 drives the pump 81. The fixed displacement pump 81 is preferably a gear pump, which presents the advantage of being reliable, robust and inexpensive, but which requires that the speed at which it is driven is not too low in order to maintain good internal lubrication and, hence, a long service life. In this embodiment, the pump 81 is therefore designed to be driven by the electric motor 82 at a predetermined minimum speed at which the pump 81 delivers fluid into the circulation circuit 60 with a minimum value for the delivery rate QR. Furthermore, the control unit 50 is then unable to control the drive of the pump 81 below the predetermined minimum speed, regardless of the values of the first target flow Q1 and the second target flow Q2. It is understood that, when the control unit 50 calculates that the sum of the target flow rates Q1 and Q2 is less than the minimum value of the delivery flow rate QR, associated with the aforementioned predetermined minimum speed, the control unit 50 controls the drive of the pump 81 at the predetermined minimum speed, so that the delivery flow rate QR at the outlet of the motor pump 80 is equal to the aforementioned minimum value and is therefore greater than the sum of the flow rates Q1 and Q2. On the other hand, when the sum of the flow rates Q1 and Q2 determined by the control unit 50 is equal to or greater than the minimum value associated with the aforementioned predetermined minimum speed, the control unit 50 controls the motor pump 80 so that the delivery flow rate QR at the outlet of the motor pump 80 is equal to the sum of the target flow rates Q1 and Q2.

The hydraulic system S also includes a flow regulation sub-system 90 allowing to regulate the fluid flow in the circulation circuit 60 between, on the one hand, the reservoir 70 and, on the other hand, the actuators 41 of group G1 and the actuators 42 of group G2. This flow regulation sub-system 90 is controlled by the control unit 50 and are able, by means of the control by the control unit 50, both to send jointly to the groups G1 and G2 a regulated proportion of the fluid delivered by the motor pump 80, this regulated proportion presenting a controlled flow rate Q0 equal to the sum of the first target flow rate Q1 and the second target flow rate Q2, and then dividing this regulated proportion into two adjusted portions, which respectively present the first target flow rate Q1 and the second target flow rate Q2 and which are respectively sent to group G1 and group G2. It is understood that, when the delivered flow QR is, at the outlet of the motor pump 80, equal to the sum of the target flow Q1 and the target flow Q2, the flow regulation sub-system 90 is controlled in such a way that the controlled flow Q0 is equal to the delivered flow QR, which is to say that the aforementioned regulated proportion corresponds to the entire flow delivered by the motor pump 80. On the other hand, when the delivered flow rate QR is, at the outlet of the motor pump 80, greater than the sum of the target flow rates Q1 and Q2, the flow regulation sub-system 90 is controlled so that the controlled flow rate Q0 is equal to only a fraction of the delivered flow rate QR, that is to say, the aforementioned controlled proportion corresponds to only one part of the flow delivered by the motor pump 80.

The flow regulation sub-system 90 includes a flow regulating device 91 and a flow distribution device 92, which are arranged in series between the motor pump 80 and the actuators 41 and 42, the flow distribution device 92 being downstream of the flow regulating device 91 vis-a-vis the flow delivered by the motor pump 80. This embodiment is practical and economical.

The flow regulating device 91 presents three ports, namely:

- an intake port 91A which receives all the flow leaving the motor pump 80 via a line 61 of the circulation circuit 60, this line 61 connecting the flow from the motor pump 80 to the intake of the flow control device 91,
- a main outlet port 91B which sends the fluid leaving the flow control device 91 to the flow distribution device 92, via a line 62 of the circulation circuit 60, and
- a secondary outlet port 91C which sends the fluid leaving the flow control device 91 directly to the reservoir 70, via a line 63 of the circulation circuit 60.

The flow regulating device 91 is able to regulate the flow of fluid from the intake port 91A toward the main outlet port 91B and the secondary outlet port 91C, being controlled by the control unit 50 in such a way that the main outlet port 91B receives the aforementioned regulated proportion of the fluid delivered by the motor pump 80, while an excess of the fluid delivered by the motor pump is evacuated by the secondary outlet port 91C, this excess presenting a flow rate equal to the difference between the delivered flow rate QR and the controlled flow rate Q0, bearing in mind that the controlled flow rate Q0 is equal to the sum of the target flow rates Q1 and Q2. Thus, when the delivered flow rate QR is equal to the sum of the target flow rates Q1 and Q2, the fluid flow rate in the secondary outlet port 91C is zero, whereas when the delivered flow rate QR is strictly greater than the sum of the target flow rates Q1 and Q2, the fluid flow rate in the secondary outlet port 91C is non-zero, being equal to the difference between the delivered flow rate QR and the sum of the target flow rates Q1 and Q2.

In order to control the flow as described above, the flow control device 91 is provided, in a particularly clever and inexpensive embodiment, to include a proportional electrovalve 91.1 and a pressure compensator 91.2, as shown in FIG. 2. The proportional electrovalve 91.1 is able to control the flow of fluid from the intake port 91A to the main outlet port 91B, i.e. to interrupt this flow and, when not interrupted, to adjust this flow by a controlled passage section, as a function of a control signal which the control unit 50 emits from the sum of the target flow rates Q1 and Q2. The pressure compensator 91.2 is able to connect the upstream of the proportional electrovalve 91.1 to the secondary outlet port 91C according to a connection proportion that is a function of the pressure differential between the upstream and downstream of the proportional electrovalve 91.1. Thus, when the control unit 50 determines that it is operating the motor pump 80 so that the delivered flow QR is equal to the sum of the target flows Q1 and Q2, the control unit 50 opens completely the passage section through the proportional electrovalve 91.1: in this case, the pressure difference between upstream and downstream of the proportional electrovalve 91.1 is almost zero, so that the pressure compensator 91.2 keeps the connection between the upstream of proportional electrovalve 91.1 and secondary outlet port 91C closed, under the effect of an ad hoc spring integrated into the pressure compensator 91.2. When the control unit 50 determines that it is operating the motor pump 80 in such a way that the delivered flow QR is strictly greater than the sum of the target flows Q1 and Q2, the control unit 50 only partially opens the passage section of the proportional electrovalve 91.1, with an opening proportion corresponding substantially to the fraction represented by the sum of the target flows Q1 and Q2 vis-a-vis the delivered flow QR: in this case, the upstream of the proportional electrovalve 91.1 presents over-pressurized vis-a-vis the downstream of this proportional electrovalve, so that the pressure compensator 91.2 opens the connection between the upstream of the proportional electrovalve 91.1 and the secondary outlet port 91C, until the pressure upstream of the proportional electrovalve 91.1 and the pressure downstream of this proportional electrovalve are balanced, to which the load of the spring integrated in the pressure compensator 91.2 is added.

In the example of the embodiment shown in the figures, the flow control device 91 also includes an on-off electrovalve 91.3, which is able to control the communication of a spring loaded chamber of the pressure compensator 91.2 with the reservoir 70, selectively allowing or interrupting this communication, as a function of a control signal emitted by the control unit 50. The on-off electrovalve 91.3 can, thus, be provided to be normally open, so that, as long as the control unit 50 does not command it to close, the spring loaded chamber of the pressure compensator 91.2 communicates freely with the secondary outlet port 91C, via the on-off electrovalve 91.3, thus allowing the pressure in the spring loaded chamber of the pressure compensator 91.2 to be virtually zero. Under the effect of the motor pump 80, the pressure in the line 61 increases to the spring-loaded value of the pressure compensator 91.2, thereby changing the pressure compensator 91.2 to allow the flow delivered by the motor pump 80 from the intake port 91A toward the outlet port 91C, via the pressure compensator 91.2. The pressure in the intake port 91A may not exceed the value corresponding to the spring load of the pressure compensator 91.2. In steady-state operation, as soon as the lifting structure 30 is to be displaced, the control unit 50 commands the closure of the on-off electrovalve 91.3, thus interrupting communication between the spring loaded chamber of the pressure compensator 91.2 and the secondary outlet port 91C. The pressure in the spring loaded chamber of the pressure compensator 91.2 is then equal to the pressure in the main outlet port 91B, allowing normal operation of the pressure compensator 91.2, as described above. The pressure in the intake port 91A is no longer limited to the value corresponding to the spring load of the pressure compensator 91.2.

In addition, in the example of the embodiment considered in the figures, the flow control device 91 includes an on-off distributor 91.4, which is able to send fluid from downstream of the proportional electrovalve 91.1 toward the hydraulic steering device 13, under the control of the control unit 50. The on-off distributor 91.4 is, for example, a four-way, three-position distribution valve. The on-off distributor 91.4 allows diverting the flow from the main outlet port 91B toward the hydraulic directional steering 13, bypassing the flow distribution device 92. In this way, when the hydraulic system S is not being used to activate the actuators 41 and 42, it can be used to activate the hydraulic steering device 13 and thus allow to orient the displacement trajectory of the aerial work platform 1 over the ground. The aerial work platform 1 thus avoids having, in addition to the hydraulic system S, another hydraulic system dedicated to activating the hydraulic steering device 13.

In addition, the arrangement of the on-off electrovalve 91.3 and the on-off distributor 91.4 in the flow-regulating device 91 presents a practical and economic interest, in particular by providing that this flow-regulating device 91 is integrated into the chassis 10.

For its part, the flow distribution device 92 has three ports, namely:

- an inlet port 92A, which receives fluid from the main outlet port 91B of the flow control device 91, via the line 62, and which is thus, in operation, supplied with the controlled proportion, presenting the controlled flow rate Q0, of the fluid delivered by the motor pump 80,
- a first outlet port 92B, sending the fluid to the actuators 41 of group G1, via a line 64 of the circulation circuit 60, and
- a second port 92C, which sends the fluid to the actuators 42 of group G2, via a line 65 of the circulation circuit 60.

The flow distribution device 92 is able to distribute all the fluid from the inlet port 92A between the first outlet port 92B and the second outlet port 92C, being controlled by the control unit 50 so that the first outlet port 92B receives an adjusted share of the aforementioned regulated proportion, presenting the target flow Q1, and the second outlet port 92C receives the remainder of the regulated proportion, in other words an adjusted share thereof, presenting the target flow Q2.

Thus, when one of the actuators 41 of group G1 is activated, while none of the actuators 42 of group G2 is activated, the control unit 50 sends the entire flow from the inlet 92A to the first outlet 92B, via the flow distribution device 92. Similarly, when one of the actuators 42 of group G2 is activated and none of the actuators 41 of group G1 is activated, the control unit 50 sends all the flow from the inlet port 92A to the second outlet port 92C, by the flow distribution device 92. When one of the actuators 41 of group G1 and one of the actuators 42 of group G2 are activated simultaneously, the control unit 50 distributes the flow from the inlet port 92A between the outlet ports 92B and 92C, by the flow distribution device 92, with a distribution key corresponding to the respective proportions of the target flow Q1 and the target flow Q2.

In order to achieve the flow distribution described above, the flow distribution device 92 includes, in a particularly clever and inexpensive embodiment, a proportional electrovalve 92.1 and a pressure compensator 92.2, as shown in FIG. 2. The proportional electrovalve 92.1 is able to control the flow of fluid from the inlet port 92A toward the first outlet port 92B, i.e. to interrupt this flow and, when not interrupted, to adjust this flow by a controlled passage section, as a function of a control signal emitted by the control unit 50 from the respective values of the target flow rates Q1 and Q2. The pressure compensator 92.2 is able to connect the upstream of the proportional electrovalve 92.1 to the second outlet port 92C, and to connect the downstream of this proportional electrovalve to the first outlet port 92B, according to respective inverse connection proportions that are a function of the pressure differential between the upstream and downstream of the proportional electrovalve 92.1. Thus, when one of the actuators 41 of group G1 is activated while none of the actuators 42 of group G2 is activated, the control unit 50 opens completely the passage section of the proportional electrovalve 92.1: in this case, there is no pressure differential between the upstream and downstream of this proportional electrovalve 92.1, so that the pressure compensator 92.2 keeps the connection between the upstream of this electrovalve and the outlet port 92C fully closed, while keeping the connection between the downstream of this electrovalve and the outlet port 92B fully open, under the effect of an ad hoc spring built into the pressure compensator 92.2. When one of the actuators 42 of group G2 is activated and none of the actuators 41 of group G1 is activated, the control unit 50 closes the passage section of the proportional electrovalve 92.1 completely: in this case, the upstream of the proportional electrovalve 92.1 presents an overpressure vis-a-vis the downstream of this electrovalve, so that the pressure compensator 92.2 fully opens the connection between the upstream of the proportional electrovalve 92.1 and outlet port 92C, while fully closing the connection between the downstream of the proportional electrovalve 92.1 and outlet port 92B, under the effect of the aforementioned permanent overpressure, which counteracts the effect of the spring built into the pressure compensator 92.2. When one of the actuators 41 of group G1 and one of the actuators 42 of group G2 are activated simultaneously, the control unit 50 only partially opens the passage section of the proportional electrovalve 92.1, with an opening proportion corresponding substantially to the percentage that the target flow Q1 represents vis-a-vis the sum of the target flows Q1 and Q2: in this case, the upstream of the proportional electrovalve 92.1 presents an overpressure vis-a-vis the downstream, so that the pressure compensator 92.2 partially opens the connection between the upstream of the electrovalve and outlet port 92C, while inversely closing the connection between the downstream of the electrovalve and outlet port 92B, until the pressure upstream of the proportional solenoid 92.1 and the pressure downstream of this electrovalve are balanced, supplemented by the spring load built into the pressure compensator 92.2.

The flow regulation means 90 also includes, for each of the actuators 41, an on-off distributor 93 that is able to send fluid to the corresponding actuator 41, from the flow distribution device 92. On the inlet side, each on-off distributor 93 is connected to the first outlet port 92B of the flow distribution device 92, via the line 64, while the outlet of each on-off distributor 93 is connected to the reservoir 70, via a line 66 of the circulation circuit 60. Similarly, the flow regulation sub-system 90 includes, for each actuator 42, an on-off distributor 94 that is able to send fluid to the corresponding actuator, from the flow distribution device 92. Each on-off distributor 94 is connected, on the inlet side to the second outlet port 92C of the flow distribution device 92, via the line 65, while on the outlet, each on-off distributor 94 is connected to the reservoir 70 via the line 66, which is thus common to the various on-off distributors 93 and 94. The on-off distributors 93 and 94 are controlled by the control unit 50. Each on-off distributor 93, 94 is, for example, a four-way, three-position valve.

The operation of the aerial work platform 1 will now be described, thus illustrating an example of the control method for this aerial work platform.

When the operator using the aerial work platform 1 commands the activation of one of the actuators 41 to displace the part of the lifting structure 30 associated with this actuator 41, the target flow rate Q1 is determined as a function of this activation, in particular the speed of the latter. Similarly, when the operator commands the activation of one of the actuators 42, the target flow rate Q2 is determined as a function of this activation, in particular the speed of the latter. In practice, the target flow rates Q1 and Q2 are determined by the control unit 50, as explained above. Also as explained above, the target flow rate Q1 is zero if none of the actuators 41 is activated simultaneously with the actuator 42 concerned, or the target flow rate Q2 is zero if none of the actuators 42 is activated simultaneously with the actuator 41 concerned.

In all cases, the motor pump 80 is then controlled, in practice by the control unit 50, so that the delivery flow rate QR of the fluid delivered by the motor pump is greater than or equal to the sum of the target flow rates Q1 and Q2. In particular, when the lifting structure 30 is displaced at high speed, the sum of the target flow rates Q1 and Q2 is substantial and is therefore generally greater than the minimum value of the delivery flow rate QR, associated with the minimum speed at which the pump 81 must be driven by the motor 82 in the case where the motor pump 80 has the specificity of presenting such a minimum drive speed. On the other hand, when the lifting structure 30 is displaced at low speed, which is typically the case when the lifting structure is in a constrained environment and/or in the approach phase, the sum of the target flow rates Q1 and Q2, in particular when one of these two target flow rates is zero, may be lower than the minimum value of the delivered flow rate QR.

In all cases, a regulated proportion of the fluid delivered by the motor pump 80, provided with the controlled flow rate Q0 equal to the sum of target flow rates Q1 and Q2, is sent jointly to the groups G1 and G2 of the actuators 41 and 42. This regulation thus ensures that the flow sent to the groups G1 and G2 has the controlled flow rate Q0, even when the delivered flow rate QR is greater than the controlled flow rate Q0 value, by evacuating the corresponding excess delivered flow rate, the excess being returned directly to the reservoir 70. In practice, this regulation is operated by the flow regulation device 91, which is controlled accordingly by the control unit 50, as detailed above.

The aforementioned regulated proportion is then divided into two adjusted parts, which respectively have the first target flow rate Q1 and the second target flow rate Q2, and which are respectively sent to group G1 and group G2. This distribution ensures that the flow sent to each of the groups G1 and G2 corresponds to the fluid requirement for the activation ordered by the operator. In particular, this distribution ensures that the totality of the above-mentioned regulated proportion is sent only to group G1 when the target flow rate Q2 is zero and, conversely, is sent only to group G2 when the target flow rate Q1 is zero. In practice, this distribution is operated by the flow distribution device 92, controlled accordingly by the control unit 50, as explained above.

The adjusted portion sent to group G1 then reaches the actuator 41 the activation of which the user has ordered, via the on-off distributor 93 associated with this actuator 41, this on-off distributor 93 being controlled in the open position by the control unit 50, while the other on-off distributors 93 are kept closed. Similarly, the adjusted portion sent to group G2 reaches the actuator 42 the activation of which has been ordered by the operator, via the on-off distributor 94 associated with this actuator 42, this on-off distributor 94 being controlled in the open position by the control unit 50, while the other on-off distributors 94 are kept closed.

Thus, the lifting structure 30 can be displaced according to two simultaneous movements in a precise and controlled manner. The corresponding control of the lifting platform 1 is reliable, yet simple and inexpensive to implement. This being the case, it is understood that the hydraulic system S of the aerial work platform 1 is not provided to move the lifting structure 30 according to more than two simultaneous movements. It is also understood that the hydraulic system S is not provided to displace the lifting structure 30 according to two simultaneous movements resulting from two actuators 41 or even with two simultaneous movements resulting from two actuators 42, in other words, according to two simultaneous movements resulting from two actuators of the same group G1 and G2. The size of the aerial work platform 1 is therefore preferably adapted accordingly, the aerial work platform 1 being designed in particular to lift the basket 20 to a height of less than 16 meters. Similarly, the aerial work platform 1 is preferably "all-electric", in other words, that, in addition to the electric motorization provided for its motor pump 80, the motorization 14 of the aerial work platform 1 is also electric: in particular, the chassis 10, which then advantageously integrates the motor pump 80, presents a total electrical power that is preferably between 2 and 15 kW.

Lastly, various modifications and alternatives of the aerial work platform 1 and its control method, which have been described so far, can be envisaged. For example

- within the lifting structure 30, the rotating turret 31 can be replaced by a fixed baseplate; and/or
- in the case where the pump 81 of the motor pump 80 does not need to be driven at a predetermined minimum speed, the flow-regulating device 91 can be simplified accordingly.

The invention claimed is:

1. Aerial work platform including:

a chassis which is provided with ground translation members, a basket which is adapted for an operator to stand on, a lifting structure, which supports the basket and is arranged on the chassis so as to more or less lift the basket relative to the chassis, hydraulic actuators which act on respective parts of the lifting structure so as to displace said respective parts relative to the rest of the lifting structure or relative to the chassis, a hydraulic system comprising:

a circulation circuit through which fluid flows between a reservoir and the hydraulic actuators, a motor pump which is electric and draws fluid from the reservoir and delivers to the circulation circuit for circulation, and a flow regulation sub-system for regulating fluid flow in the circulation circuit between the reservoir and the hydraulic actuators, and a control unit allowing to control the hydraulic system, wherein the hydraulic actuators are divided between a first group of one or more of the hydraulic actuators and a second group of one or more of the hydraulic actuators, the hydraulic actuator or actuators of the first group being distinct from the hydraulic actuator or actuators of the second group, wherein the control unit is able to:

determine both a first target flow rate as a function of by-operator activation of the hydraulic actuator(s) of the first group and a second target flow rate as a function of by-operator activation of the hydraulic actuator(s) of the second group, and control the motor pump so that the motor pump delivers the fluid at a delivery flow rate which is greater than or equal to the sum of the first and second target flow rates, wherein the flow regulation sub-system is able, by being controlled by the control unit, to:

send jointly toward the first and second groups a regulated proportion of fluid delivered by the motor pump, this regulated proportion presenting a controlled flow rate which is equal to the sum of the first and second target flow rates, then dividing said regulated proportion into two adjusted portions, which respectively present the first and second target flow rates and which are respectively sent to the first group and to the second group, wherein the flow regulation sub-system comprises a flow distribution device which:

is provided with three ports, namely an inlet port, which is supplied with said regulated proportion of the fluid delivered by the motor pump, a first outlet port-(92B), which supplies fluid to the first group, and a second outlet port, which supplies fluid to the second group, and is able to distribute all fluid in the inlet port between the first and second outlet ports, the flow distribution device being controlled by the control unit so that the first outlet port receives the adjusted portion presenting the first target flow rate and the second outlet port receives the adjusted portion presenting the second target flow rate, and wherein the flow regulation sub-system further comprises a flow regulating device, which:

is provided with three ports, namely an intake port, which receives all fluid delivered by the motor pump, a main outlet port, which sends fluid to the inlet port of the flow distribution device, and a secondary outlet port, which sends fluid directly to the reservoir, and is able to regulate a flow of fluid from the intake port toward the main and secondary outlet ports, the flow regulating device being controlled by the control unit so that the main outlet port receives said regulated proportion of fluid delivered by the motor pump (80) while a surplus of fluid delivered by the motor pump, which has a flow rate equal to the difference between the delivered flow rate and the controlled flow rate, is evacuated through the secondary outlet port.

2. The aerial work platform according to claim 1, wherein the motor pump includes a fixed-displacement pump and an electric motor which drives the fixed-displacement pump, the delivery flow rate being proportional to the speed at which the electric motor drives the fixed-displacement pump, wherein the fixed-displacement pump is designed to be driven by the electric motor at a predetermined minimum speed which is associated with a minimum value for the delivery flow rate, and wherein the control unit is unable to control driving of the fixed-displacement pump below the predetermined minimum speed, irrespective of the values of the first and second target flow rates.

3. The aerial work platform according to claim 1, wherein the flow distribution device includes:

a first proportional electrovalve, which is able to control flow of fluid from the inlet port to the first outlet port so as to interrupt or adjust by a controlled passage section flow of fluid from the inlet port to the first outlet port, as a function of a control signal which the control unit emits, from the respective values of the first and second target flow rates, and a first pressure compensator, which is able to connect upstream of the first proportional electrovalve to the second outlet port and to connect downstream of the first proportional electrovalve to the first outlet port according to inverse respective connection proportions which are a function of the pressure differential between upstream and downstream of the first proportional electrovalve.

4. The aerial work platform according to claim 1, wherein the flow regulating device includes:

a second proportional electrovalve, which is able to control flow of fluid from the intake port to the main outlet port so as to interrupt or adjust by a controlled passage section flow of fluid from the intake port to the main outlet port, as a function of a control signal which the control unit emits, from the sum of the first and second target flow rates, and a second pressure compensator, which is able to connect upstream of the second proportional electrovalve to the secondary outlet port according to a connection proportion which is a function of the pressure differential between upstream and downstream of the second proportional electrovalve.

5. The aerial work platform according to claim 4, wherein the flow regulating device also includes an on-off electrovalve, which is able to control communication between a spring loaded chamber of the second pressure compensator and the reservoir so as to interrupt or allow communication between the spring loaded chamber of the second pressure compensator, as a function of a control signal which the control unit emits.

6. The aerial work platform according to claim 4, wherein the chassis is equipped with a hydraulic steering device, which acts on at least some of the ground translation members so as to adjust orientation of the at least some of the ground translation members relative to the chassis in order to direct the aerial work platform on the ground, and wherein the flow regulating device further includes an on-off distributor which is controlled by the control unit and able to send fluid from downstream of the second proportional electrovalve toward the hydraulic steering device.

7. The aerial work platform according to claim 1, wherein the flow regulating device is integrated into the chassis.

8. The aerial work platform according to claim 1, wherein several hydraulic actuators are provided in the first group and/or in the second group and are each associated with an on-off distributor of the flow regulation sub-system, which is controlled by the control unit and is able to send fluid to the corresponding hydraulic actuator from the rest of the flow regulation sub-system.

9. The aerial work platform according to claim 1, wherein the lifting structure comprises a turret, which rests on the chassis and is rotatable relative to the chassis about an rotation axis extending perpendicularly to the ground, and an arm, which connects the turret to the basket and is deployable to move the basket more or less away from the turret, and wherein the hydraulic actuators act both on the turret to rotate the turret about the rotation axis relative to the chassis and on the arm to deploy the arm relative to the turret.

10. The aerial work platform according to claim 1, wherein the lifting structure is designed to lift the basket to a height of less than 16 meters.

11. The aerial work platform according to claim 1, wherein the chassis incorporates the motor pump and an electric motor which drives the ground translation members, the chassis having a total electric power of between 2 and 15 kW.

12. A method for controlling an aerial work platform, the aerial work platform comprising:

a chassis provided with ground translation members, a basket suitable for an operator to stand on, a lifting structure, which supports the basket and is arranged on the chassis so as to more or less lift the basket relative to the chassis, hydraulic actuators, which act on respective parts of the lifting structure so as to move said respective parts relative to the rest of the lifting structure or relative to the chassis, and which are divided between a first group of one or more of the hydraulic actuators and a second group of one or more of the hydraulic actuators, the hydraulic actuator or actuators of the first group being distinct from the hydraulic actuator or actuators of the second group, and a hydraulic system comprising:

a circulation circuit through which fluid flows between a reservoir and the hydraulic actuators, a motor pump which is electric and draws fluid from the reservoir and delivers to the circulation circuit for circulation, and a flow regulation sub-system for regulating fluid flow in the circulation circuit between the reservoir and the hydraulic actuators, wherein a first target flow rate is determined as a function of activation of one or more hydraulic actuators of the first group by an operator using the aerial work platform, wherein a second target flow rate is determined as a function of activation of one or more hydraulic actuators of the second group by the operator, wherein the motor pump is controlled so that fluid delivered by the motor pump presents a delivery flow rate which is greater than or equal to the sum of the first and second target flow rates, wherein the flow regulation sub-system is controlled to:

jointly send toward the first and second groups a regulated proportion of fluid delivered by the motor pump, the regulated proportion presenting a controlled flow rate which is equal to the sum of the first and second target flow rates, then divide said regulated proportion into two adjusted portions, which respectively present the first and second target flow rates and which are respectively sent to the first group and to the second group, wherein the flow regulation sub-system comprises:

a flow distribution device which is provided with three ports, namely an inlet port, which is supplied with said regulated proportion of fluid delivered by the motor pump, a first outlet port, which sends fluid to the first group, and a second outlet port, which sends fluid to the second group, and a flow regulating device which is provided with three ports, namely an intake port, which receives all fluid delivered by the motor pump, a main outlet port, which sends fluid to the inlet port of the distribution device, and a secondary outlet port, which sends fluid directly to the reservoir, wherein the flow distribution device is controlled to distribute all fluid in the inlet port between the first and second outlet ports, so that the first outlet port receives the adjusted portion presenting the first target flow rate and the second outlet port receives the adjusted portion presenting the second target flow rate, and wherein the flow regulating device is controlled to regulate the flow of fluid from the intake port to the main and secondary outlet ports, so that the main outlet port receives said regulated proportion of fluid delivered by the motor pump while an excess of fluid delivered by the motor pump, which has a flow rate equal to the difference between the delivered flow rate and the controlled flow rate, is evacuated through the secondary outlet port.

* * * * *